(12) United States Patent
Nishiwaki et al.

(10) Patent No.: US 8,045,016 B2
(45) Date of Patent: Oct. 25, 2011

(54) VIDEO CAMERA WITH FLICKER REDUCTION FUNCTION, AND METHOD FOR FLICKER REDUCTION

(75) Inventors: Katsuhiro Nishiwaki, Chita-gun (JP); Hiroshi Nagatsuma, Nagoya (JP); Yasuo Masui, Nishikamo-gun (JP); Tadamasa Nakamura, Nagoya (JP)

(73) Assignee: Elmo Company, Limited (JP)

( * ) Notice: Subject to any disclaimer, the term of this patent is extended or adjusted under 35 U.S.C. 154(b) by 628 days.

(21) Appl. No.: 12/137,803

(22) Filed: Jun. 12, 2008

(65) Prior Publication Data

US 2008/0309791 A1    Dec. 18, 2008

(30) Foreign Application Priority Data

Jun. 13, 2007 (JP) .................................. 2007-156488

(51) Int. Cl.
*H04N 9/73* (2006.01)
*H04N 5/222* (2006.01)

(52) U.S. Cl. ............................. 348/226.1; 348/333.02

(58) Field of Classification Search .... 348/226.1–228.1, 348/239, 333.02, 333.05, 333.11
See application file for complete search history.

(56) References Cited

U.S. PATENT DOCUMENTS

| | | | |
|---|---|---|---|
| 2005/0174590 A1* | 8/2005 | Kubo | 358/1.9 |
| 2007/0052733 A1* | 3/2007 | Hirabayashi et al. | 345/661 |
| 2009/0040357 A1* | 2/2009 | Ichii et al. | 348/333.02 |
| 2009/0044151 A1* | 2/2009 | Ichii et al. | 715/854 |
| 2009/0225179 A1* | 9/2009 | Ohashi et al. | 348/222.1 |
| 2010/0053438 A1* | 3/2010 | Kumamoto | 348/569 |
| 2010/0188325 A1* | 7/2010 | Inoue | 345/156 |

FOREIGN PATENT DOCUMENTS

JP    2003-244555    8/2003

* cited by examiner

*Primary Examiner* — David Ometz
*Assistant Examiner* — Carramah J Quiett
(74) *Attorney, Agent, or Firm* — Ostrolenk Faber LLP

(57) ABSTRACT

To reduce flicker appropriately according to illumination condition of an imaging subject, a video camera is provided. The video camera includes an imaging unit for generating a subject image; a superimposing image generator for generating a superimposing image; an image synthesizer for synthesize the subject image and the superimposing image to generate a synthesized image; a video signal generator for generating a video signal from the synthesized image so as to display the synthesized image. The video camera also includes a flicker reduction unit to reduce flicker caused by luminance fluctuation of a light source. The flicker reduction unit has a plurality flicker reduction modes. The mode setting unit makes the superimposing image generator to generate a settings screen as the superimposing image for assisting selection of one of the flicker reduction modes.

7 Claims, 14 Drawing Sheets

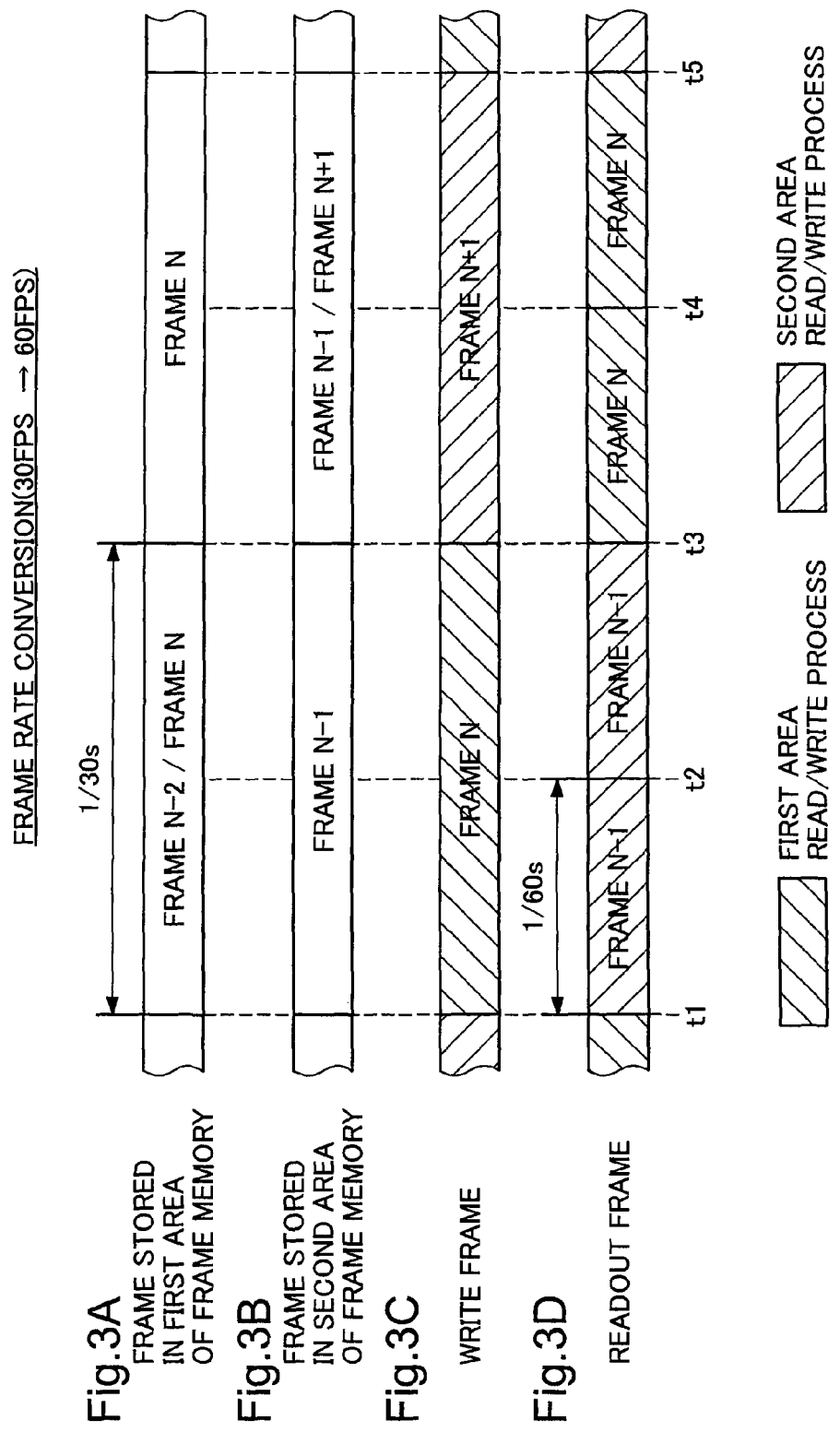

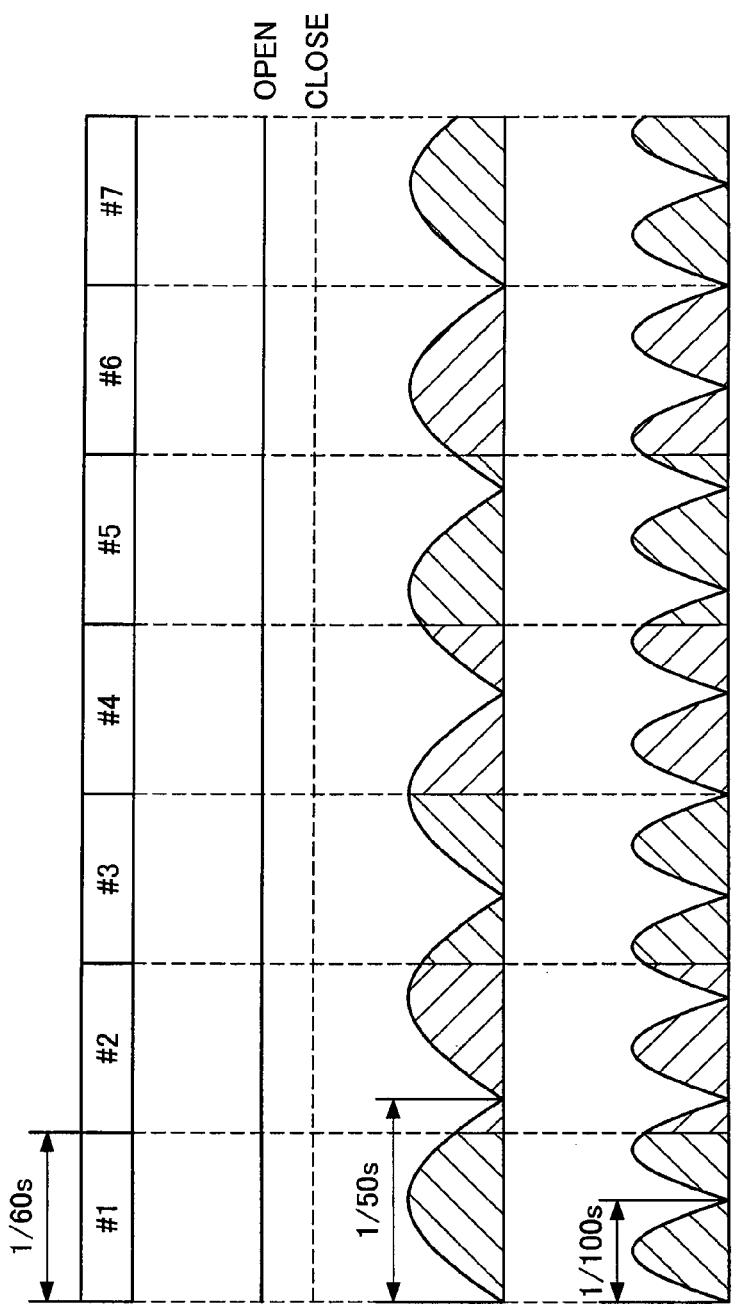

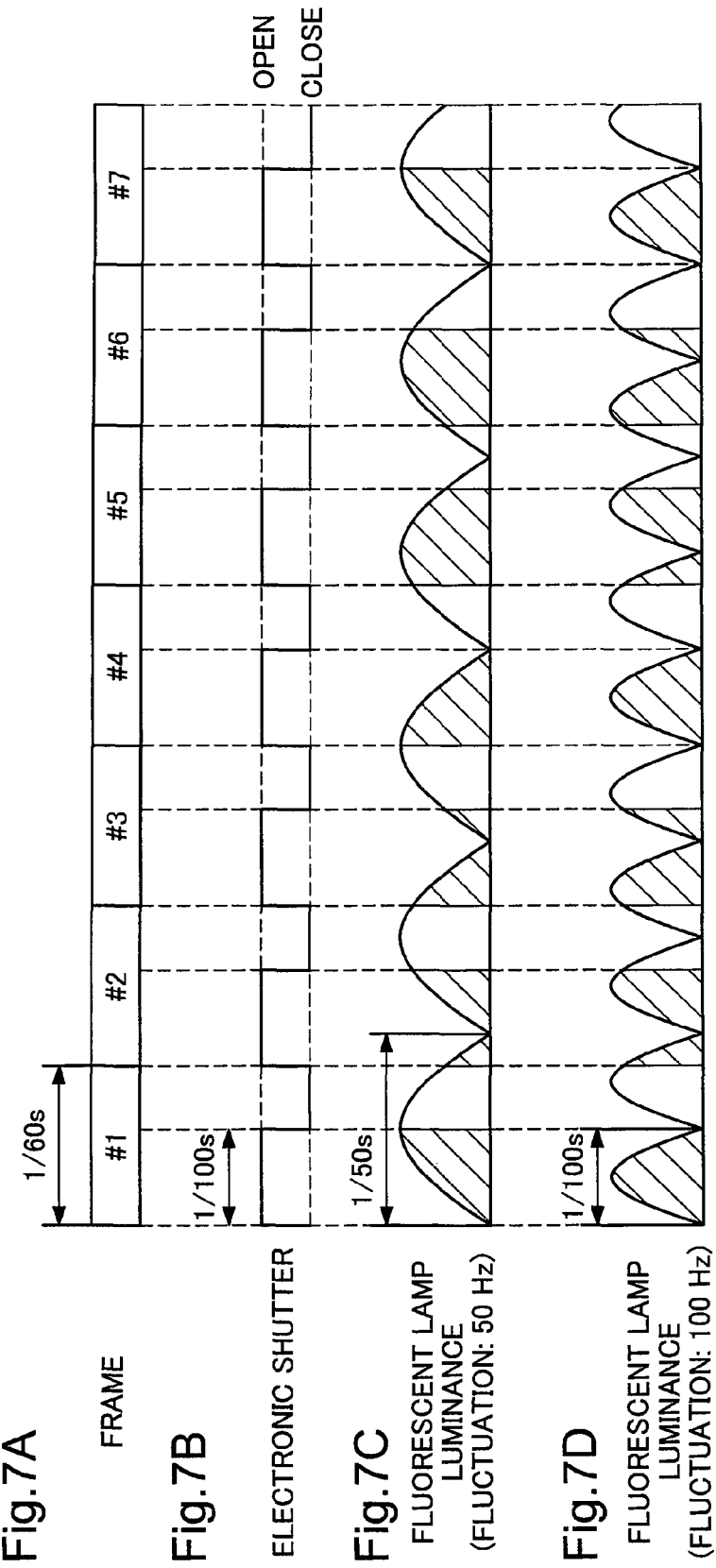

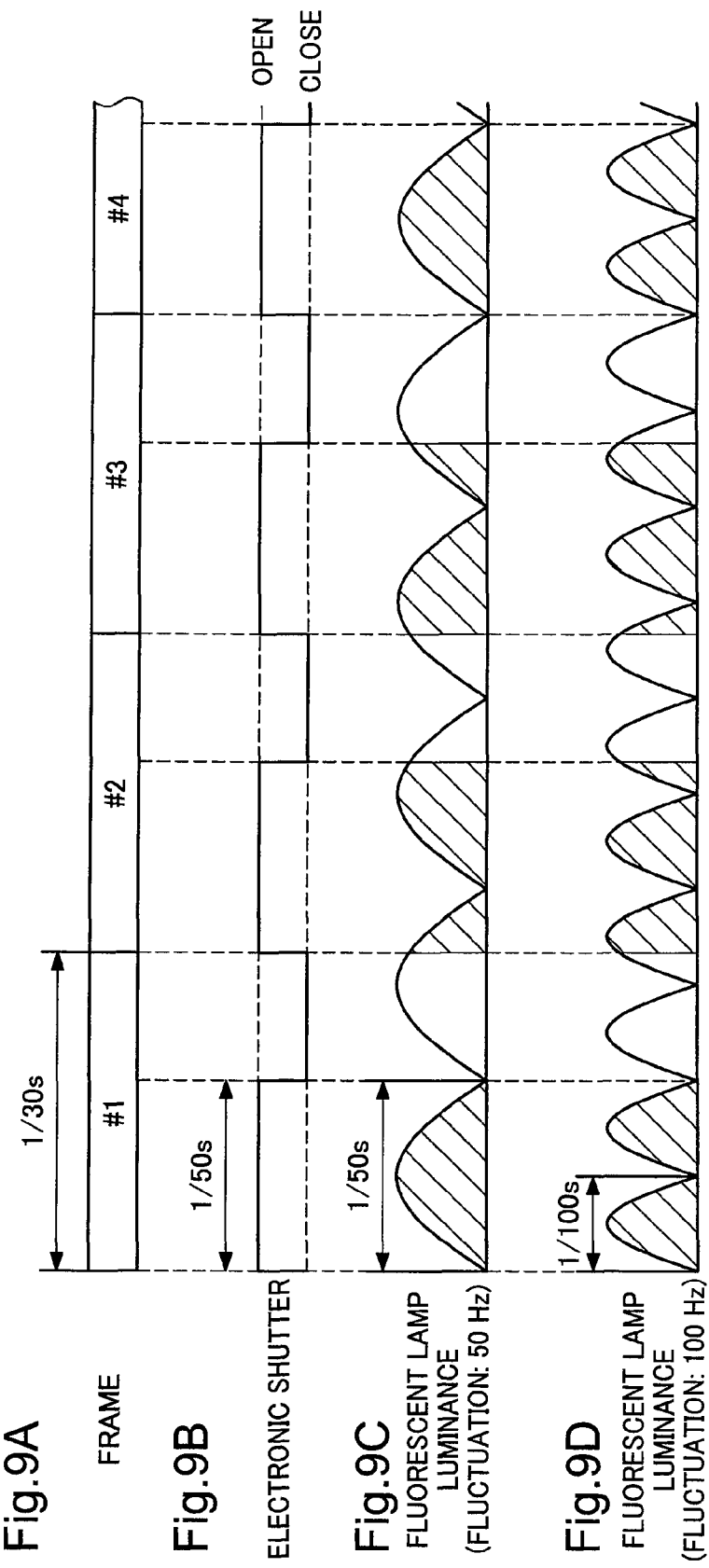

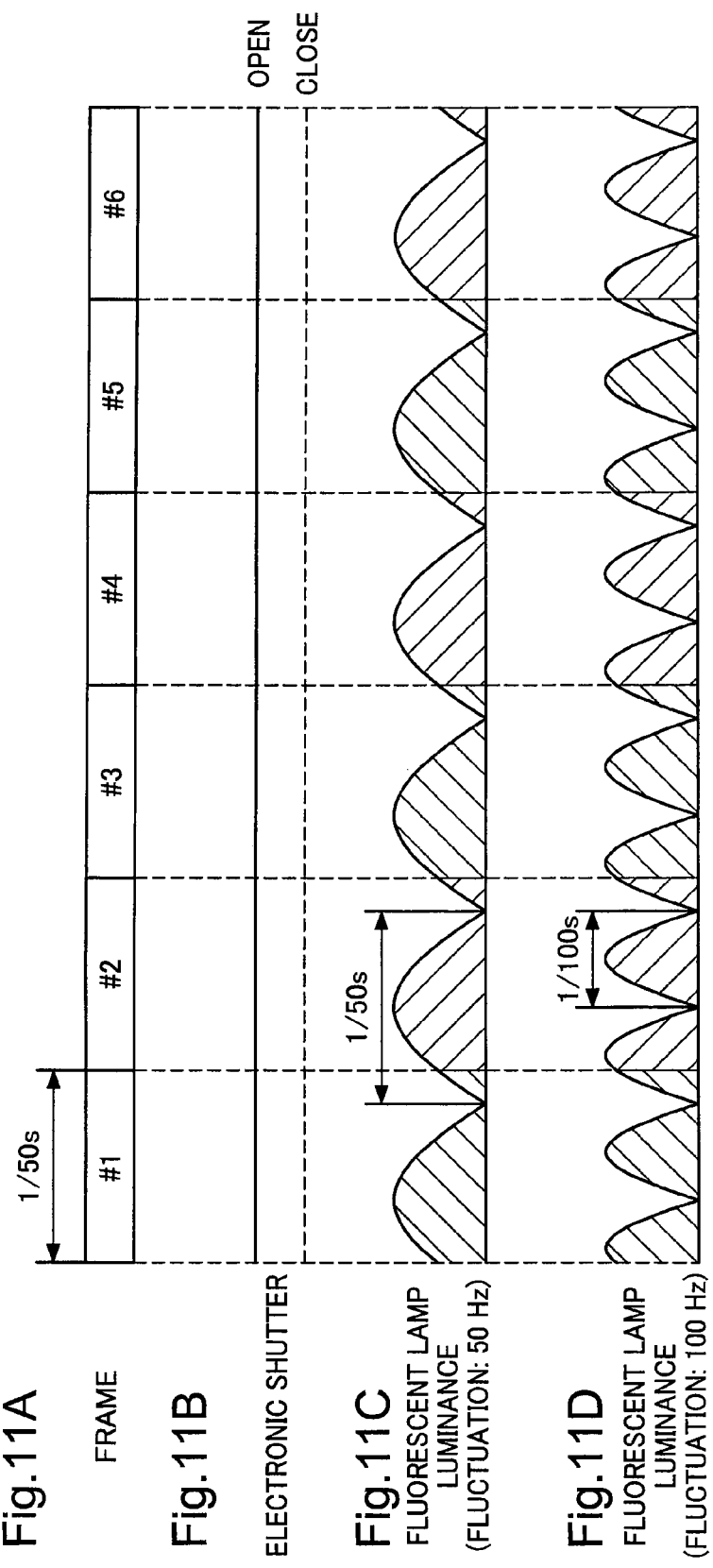

VIDEO CAMERA WITH FLICKER REDUCTION FUNCTION, AND METHOD FOR FLICKER REDUCTION

CROSS-REFERENCE TO RELATED APPLICATIONS

The present application claims the priority based on Japanese Patent Application No. 2007-156488 filed on Jun. 13, 2007, the disclosure of which is hereby incorporated herein by reference in its entirety.

BACKGROUND

1. Field of the Invention

This invention relates to a technique for reducing flicker of image shot with a video camera caused by luminance fluctuation of an illuminating light source.

2. Description of the Related Art

The frequency of commercial electrical power is standardized at either 50 Hz or 60 Hz depending on geographical region. Depending on the type of lighting equipment, the luminance of a lighting equipment which uses such commercial electrical power fluctuates at a frequency equal to the frequency of commercial electrical power (commercial power frequency) or a twice of the commercial power frequency. For example, in regions of 50 Hz commercial power frequency, the luminance of an incandescent lamp fluctuates at 100 Hz, while the luminance of a fluorescent lamp without an inverter fluctuates at 100 Hz or 50 Hz.

Meanwhile, the number of frames per second (frame rate) in a video camera and a video monitor is standardized for the television system. For example, in the case of the NTSC television system, the frame rate is standardized to be 60 frames per second (FPS).

For example, in the case of using a video camera with a frame rate of 60 FPS in a region of 50 Hz commercial power frequency to shoot video image of a subject illuminated by fluorescent light, the brightness fluctuation of individual frames, a phenomenon known as flicker, occurs resulting from the lightness fluctuation of the subject caused by the luminance fluctuation of the lighting equipment causes. Typically, the video camera is equipped with flicker reduction means for reducing such flicker. In an example of such flicker reduction means, the shutter speed is set to 1/60 second in order to reduce variation of light amount entering into the imaging elements of the video camera.

However, in such flicker reduction means provided to a video camera, flicker reduction processing is fixed for each model of the video camera. For this reason, it may sometimes occur that, flicker is not sufficiently reduced with a certain video camera under the conditions of the illuminating light source, while the picture quality of the video image output from a different video camera may degrade due to an excessive flicker reduction.

SUMMARY

An object of the present invention is to provide a technique for reducing flicker appropriately according to illumination condition of an imaging subject.

According to an aspect of the present invention, a video camera is provided. The video camera comprises: an imaging unit configured to perform imaging of a subject and to generate a subject image; a superimposing image generator configured to generate a superimposing image to be superimposed on the subject image; an image synthesizer configured to synthesize the subject image and the superimposing image to generate a synthesized image; a video signal generator configured to generate a video signal from the synthesized image, the video signal being output from the video camera so as to display the synthesized image on a display; a flicker reduction unit having a plurality of flicker reduction modes to reduce flicker caused by luminance fluctuation of a light source, each of the flicker reduction modes being configured to reduce flicker in different manner; and a mode setting unit configured to cause the superimposing image generator to generate a settings screen as the superimposing image for assisting selection of one of the flicker reduction modes.

With this arrangement, the flicker reduction unit has a plurality of flicker reduction modes. Thus, by setting the flicker reduction mode appropriately, flicker reduction may by performed with a more appropriate method specific to the illumination conditions of the subject. Moreover, the video camera outputs a video signal which contains a settings screen for assisting selection of one of the flicker reduction modes, superimposed over the image of the subject. Thus, the user can set the flicker reduction mode while viewing the settings screen, making it easier to set a more appropriate flicker reduction mode.

The video camera may further comprises: a commercial power frequency detector configured to detect the frequency of power supplied to the video camera, and the mode setting unit may cause the superimposing image generator to generate the settings screen in the event of a possibility that the commercial power frequency detected by the commercial power frequency detector causes flicker.

With this arrangement, a video signal which includes a superimposed settings screen for assisting selection of the flicker reduction mode is output in instances where the commercial power frequency is one that could possibly cause flicker. Thus, in instances where flicker may possibly occur making it advisable to set the flicker reduction mode, the user is prompted to set the flicker reduction mode thereby making it easier to set a more appropriate flicker reduction mode.

The mode setting unit may sequentially cycle through the flicker reduction modes in an order of precedence in response to instructions from the user, the order of precedence being established for the respective flicker reduction modes based on characteristics of the video signal during execution of the individual flicker.

With this arrangement, an order of precedence is established for the respective flicker reduction modes on the basis of characteristics of the video signal. The flicker reduction mode may be switched according to this order of precedence. This makes it easier to set a more appropriate flicker reduction mode.

The present invention can be reduced to practice in various modes. Examples of such modes are a video camera; a video camera control device and control method; a computer program for achieving such a video camera, control device, and control method; a recording medium having such a computer program recorded thereon; or a data signal containing such a computer program and embodied in a carrier wave.

These and other objects, features, aspects, and advantages of the present invention will become more apparent from the following detailed description of the preferred embodiments with the accompanying drawings.

BRIEF DESCRIPTION OF THE DRAWINGS

FIGS. 3A through 3D are illustrations depicting conversion of frame rate by performing readout/writing of frame images to the frame memory;

FIGS. 5A through 5D are illustrations depicting shooting by the video camera 100 with the flicker reduction mode set to "OFF";

FIGS. 7A through 7D are illustrations depicting shooting by the video camera 100 with the flicker reduction mode set to "DECREASE";

FIGS. 9A through 9D are illustrations depicting shooting by the video camera 100 with the flicker reduction mode set to "LESS1";

FIGS. 11A through 11D are illustrations depicting shooting by the video camera 100 with the flicker reduction mode set to "LESS2";

DESCRIPTION OF THE PREFERRED EMBODIMENT

Figure 1:
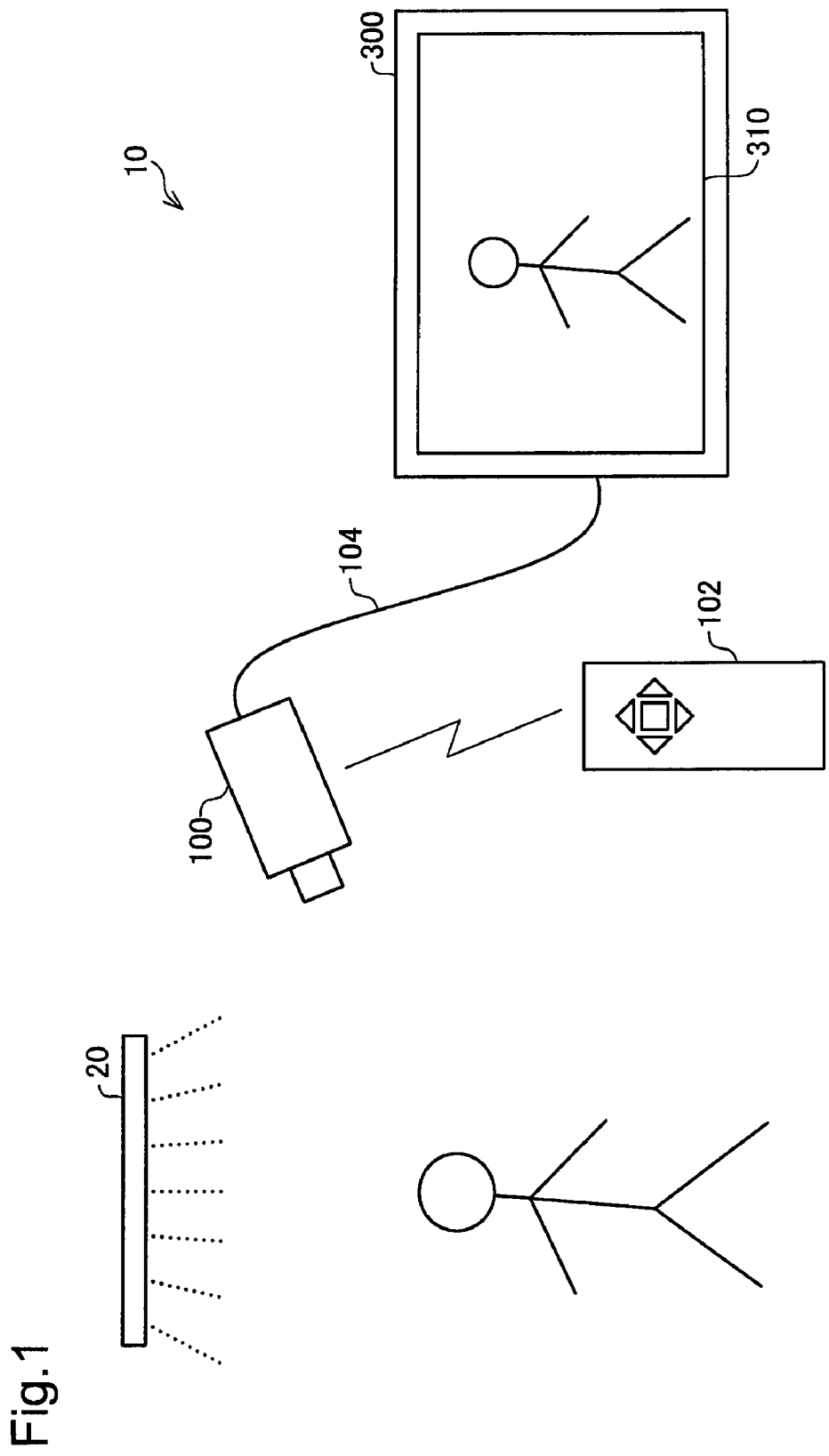
FIG. 1 is a schematic diagram showing a configuration of a monitoring system implementing a first embodiment.

A. First Embodiment:

FIG. 1 is a schematic diagram showing a configuration of a monitoring system implementing a first embodiment. The monitoring system 10 includes a video camera 100 equipped with a remote controller 102, and a video monitor 300. The user of the monitoring system 10 is able to make settings of the video camera 100 through operation of buttons provided on the remote controller 102.

The video camera 100 of the monitoring system 10 shoots an area illuminated by a fluorescent lamp 20 (illuminated area). The video image shot by the video camera 100 is supplied to the video monitor 300 through a cable 104. The video monitor 300 displays the supplied video image on a screen 310. In the example of FIG. 1, as a subject a human within the illuminated area of fluorescent lamp 20 is shot by the video camera 100. Thus, a video image including this person is displayed on the screen 310 of the video monitor 300.

Figure 2:
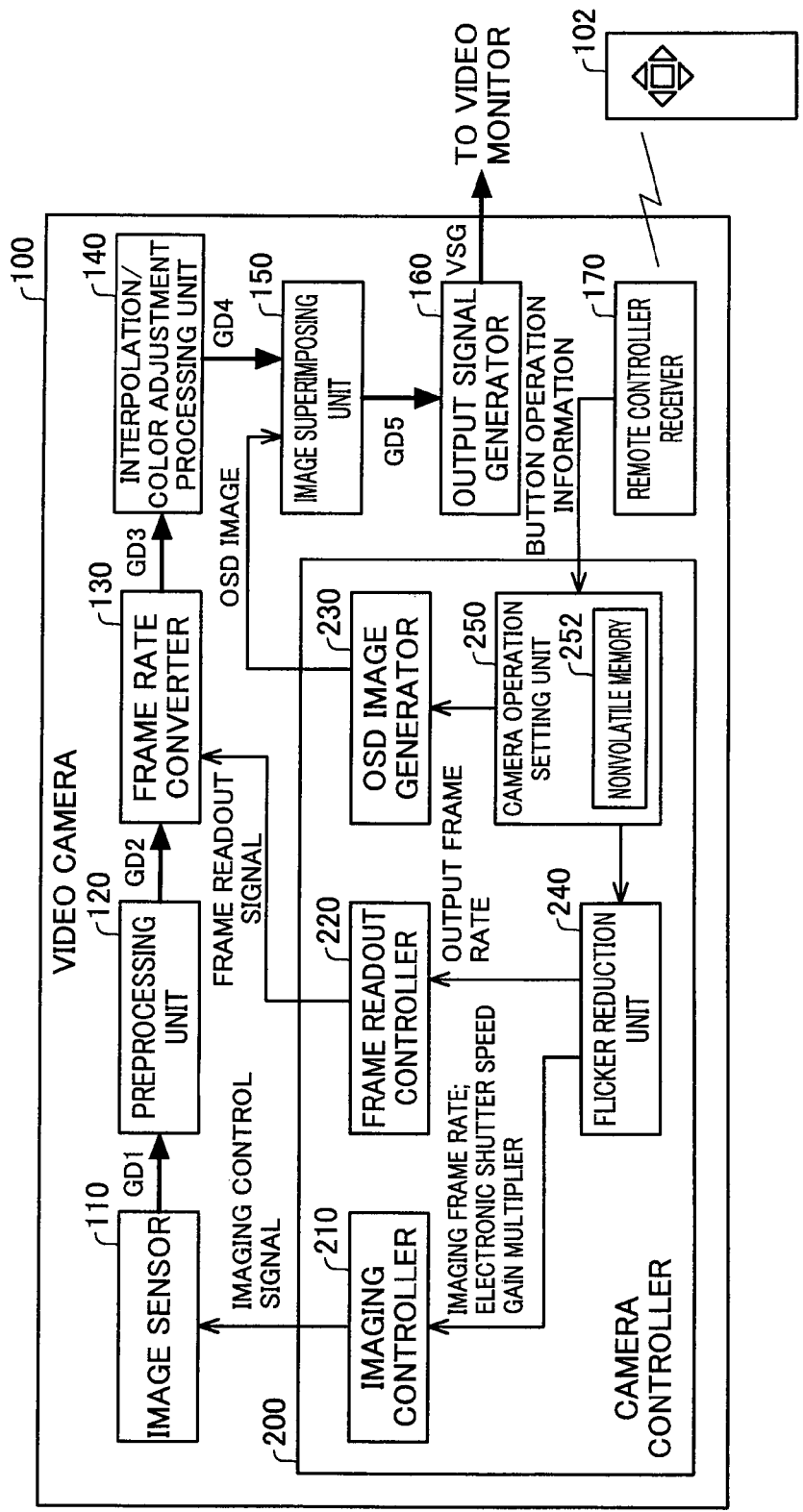
FIG. 2 is a functional block diagram showing the functional configuration of the video camera 100.

FIG. 2 is a functional block diagram showing the functional configuration of the video camera 100. The video camera 100 includes an image sensor 110, a preprocessing unit 120, a frame rate converter 130, an interpolation/color adjustment processing unit 140, an image superimposing unit 150, an output signal generator 160, a remote controller receiver 170, and a camera controller 200 for controlling these blocks.

The camera controller 200 has an imaging controller 210, a frame readout controller 220, an on-screen display (OSD) image generator 230 for generating an OSD image, a flicker reduction unit 240, and a camera operation setting unit 250 for making various operating parameter settings of the video camera 100. The camera operation setting unit 250 has a nonvolatile memory 252 for saving the operating parameter settings.

The image sensor 110 converts an image formed on a photo acceptance portion (not shown) of the image sensor 110 by a lens (not shown) into an electrical signal (image signal). The converted image signal is amplified, and the amplified image signal undergoes analog-digital conversion (A/D conversion) to generate image data GD1 representing the image formed on the photo acceptance portion. As the image sensor it is possible to employ, for example, a CMOS image sensor in which an amplifier and an analog-digital converter (A/D converter) are embedded, or a CCD image sensor equipped with an amplifier and an A/D converter (hereinafter collectively referred to as an "analog front end"). This image sensor 110 has an electronic shutter. An electronic shutter refers to a function which controls buildup time (also termed "shutter speed") of the charge which is generated depending on the intensity of light incident on the photo acceptance portion. The image signal and the image data, which are corresponding to the integration value of the intensity of light incident on the photo acceptance portion during the buildup time, are generated. The state in which charge buildup takes place is also referred to as the electronic shutter being open (open state), while the state in which charge buildup does not take place is also referred to as the electronic shutter being closed (close state).

The image sensor 110 is designed to enable modification of the number of frames shot per second (termed the "frame rate"), the shutter speed of the electronic shutter, and the amplification factor (gain) of the image signal in the image sensor 110. The imaging frame rate, the shutter speed, and the gain are specified by an imaging control signal supplied from the imaging controller 210. The effective sensitivity of the image sensor 110 varies with the settings of the imaging frame rate and the shutter speed. As will be discussed later, variations of the effective sensitivity are compensated for using a gain value equal to a standard gain value multiplied by a prescribed multiplication factor (gain multiplier). Note that, the standard gain is determined, for example, by an automatic gain control (AGC) unit.

The image data GD1 generated by the image sensor 110 undergoes prescribed preprocessing in the preprocessing unit 120. Preprocessing may involve a clamping process and white balance adjustment process, for example. The specifics of these preprocesses have no practical impact on the present invention and thus will not be discussed herein. The image data GD2 resulting from preprocessing by the preprocessing unit 120 is supplied to the frame rate converter 130.

The frame rate converter 130 performs a frame rate conversion process on the image data GD2 with the imaging frame rate, and generates image data GD3 with the output frame rate. Frame rate conversion is accomplished by writing the image data GD2 to a frame memory (not shown) provided to the frame rate converter 130, then reading the image data GD3 from the frame memory according to a frame readout signal supplied from the frame readout controller 220. Typically, the frame memory for the frame rate conversion has two areas each capable of storing an image equal to a single frame (frame image). Here, the output frame rate refers the frame rate of the video signal VSG to be supplied to the video monitor. In the case that frame rate conversion is not performed, the frame rate converter 130 may be bypassed.

FIGS. 3A through 3D are illustrations depicting conversion of frame rate by performing readout/writing of frame images to the frame memory. The example of FIGS. 3A through 3D depicts conversion of 30 frames per second (30

FPS) image data to 60 FPS image data. The horizontal axis in FIGS. 3A through 3D represents time. FIG. 3A shows frame image stored in first area of the frame memory, FIG. 3B shows frame image stored in second area. FIG. 3C depicts writing of a frame image into the frame memory on the basis of the image data GD2. FIG. 3D depicts reading out of a frame image to be used for generating image data GD3 from the frame memory. In FIGS. 3C and 3D, the hatching inclined from upper right to lower left represents readout/writing with respect to the first area of the frame memory. The hatching inclined from upper left to lower right represents readout/writing with respect to the second area of the frame memory.

As shown in FIG. 3C, during the interval from time t1 to time t3 (hereinafter termed "interval t1-t3"; this convention will be employed for other intervals as well), the N-th frame image of the image data GD2 (hereinafter termed simply "frame N"; this convention will be employed for other frames as well) is written into the first area. At this time, the frame N which is currently being written is saved into the first area in the area thereof to which the frame image has been written, while a previously saved frame N−2 remains in the area to which the new frame image has not yet been written. Thus, as depicted in FIG. 3A, during interval t1-t3, two frame images, namely, frame N−2 and frame N, are stored in the first area.

Meanwhile, frame image writing to the second area does not take place during interval t1-t3. Thus, as depicted in FIG. 3B, the second area contains only the frame N−1 that immediately preceding the frame N which is currently being written. Then, as depicted in FIG. 3D, frame is read out during intervals t1-t2 and t2-t3 respectively, through readout of the frame image from the second area to which writing of the frame image does not take place.

Next, as shown in FIG. 3C, writing of frame N+1 to the second area takes place during interval t3-t5. Thus, as depicted in FIG. 3B, during interval t3-t5 the second area contains two frame images, namely, frame N−1 and frame N+1. Meanwhile, frame image writing to the first area does not take place at this time, so the first area contains only the frame N having been written during interval t1-t3. Then, as depicted in FIG. 3D, frame N is read out during intervals t3-t4 and t4-t5 respectively, through readout of the frame image from the first area.

By providing the frame memory with two areas and alternately reading from and writing to the mutually different areas in this way, it is possible to reduce intermixing of two frame images in the frame image obtained subsequent to frame conversion. In the example of FIGS. 3A through 3D, since the frame rate is being converted from 30 PFS to 60 FPS which is twice thereof, writing and readout of image data take place to mutually different areas alternately. In cases where the post-conversion frame rate is not an integral multiple of the pre-conversion frame rate, readout of the frame image takes place from the area where writing has been completed (i.e. where frame image writing is not currently taking place) at the timing of commencement of frame readout (t1 through t5).

The interpolation/color adjustment processing unit 140 (FIG. 2) carries out processes of interpolation and color adjustment (such as a contrast adjustment and color correction) on the image data GD3 supplied from the frame rate converter 130, and generates image data GD4. The specifics of the various processes carried out on the image data GD3 in the interpolation/color adjustment processing unit 140 have no practical impact on the present invention and thus will not be discussed herein.

The image superimposing unit 150 synthesizes an OSD image generated by the OSD generator unit 230 with the image data GD4 supplied from the interpolation/color adjustment processing unit 140, and generates image data GD5 in which the OSD image is superimposed on the image shot by the image sensor 110. Synthesis of the OSD with the image data GD4 may be accomplished using a known superimposition method. Where synthesis of the OSD is not carried out, the image superimposing unit 150 may be bypassed.

From the image data GD5 supplied from the image superimposing unit 150, the output signal generator 160 generates a video signal VSG of prescribed format which is able to be handled by the video monitor 300. As shown in FIG. 1, the generated video signal VSG is supplied to the video monitor 300 through the cable 104.

By controlling the imaging controller 210 and frame readout controller 220, the flicker reduction unit 240 reduces flicker which appears at the time of shooting the subject illuminated by a periodically blinking light source such as the fluorescent lamp 20 (FIG. 1). Specifically, the flicker reduction unit 240 supplies to the imaging controller 210 instruction for setting the imaging frame rate, the shutter speed of the electronic shutter, and the gain multiplier. The flicker reduction unit 240 supplies to the frame readout controller 220 instruction for setting the output frame rate. These instructions for setting are generated according to a plurality of operating modes (flicker reduction modes) provided to the flicker reduction unit 240. The determination as to which of the several flicker reduction modes to execute is made on the basis of setting values stored in the nonvolatile memory 252 in the camera operation setting unit 250. Specific control modalities of the imaging controller 210 and frame readout controller 220 in the individual flicker reduction modes will be discussed later.

The remote controller receiver 170 receives signals transmitted from remote controller 102. The remote controller receiver 170 supplies to the camera operation setting unit 250 information representing operation of the buttons provided on the remote controller 102 (button operation information). On the basis of button operation information supplied from the remote controller receiver 170, the camera operation setting unit 250 makes the OSD generator unit 230 to generate an OSD image for assisting user operation (settings screen). Consequently, the settings screen is superimposed on the video image shot by the video camera 100, and the superimposed image is displayed on the video monitor 300 which receives the video signal VSG from the video camera 100. Additionally, on the basis of the button operation information the camera operation setting unit 250 changes setting values for various operating parameters of the video camera 100 which are stored in the nonvolatile memory 252. The camera operation setting unit 250 thus changes the operating mode of the flicker reduction unit 240 by changing the settings values which specify the flicker reduction mode. Since the camera operation setting unit changes the flicker reduction mode on the basis of button operation information in this way, the camera operation setting unit may be referred as a "mode setting unit" which sets the flicker reduction mode.

Figure 4A:
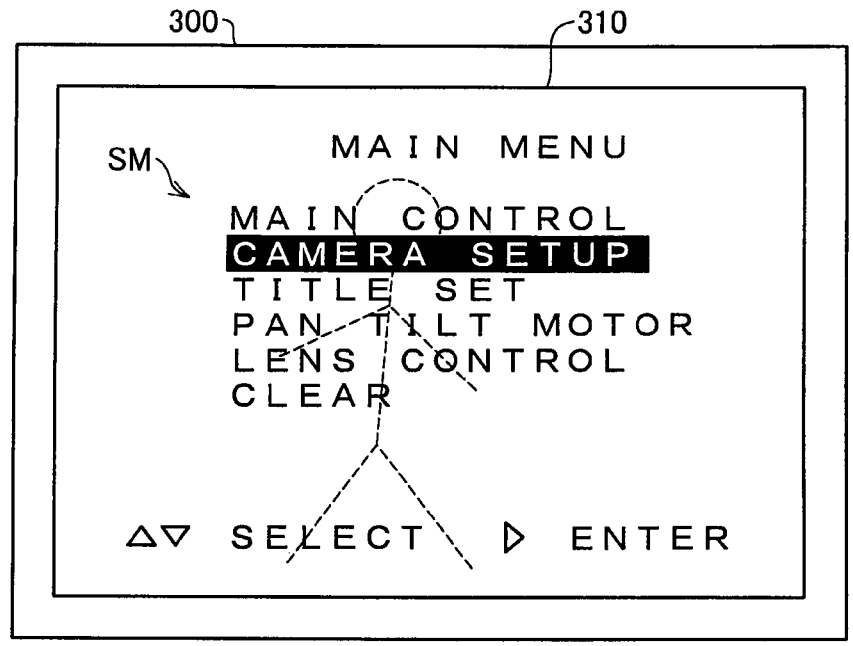
FIGS. 4A and 4B are illustrations depicting displaying a menu for changing setting of the video camera.

FIG. 4A depicts an exemplary settings screen SM for display on the screen 310 of the video monitor 300 in response to user operation of the remote controller 102. In the example of FIG. 4A, a main menu, which is initially displayed in response to operation of the remote controller 102, is superimposed on the video image shot by the video camera as an settings screen SM.

A list of submenus for setting various operating parameters of the video camera 100 is displayed on the settings screen SM. When one submenu item is selected from among a number of submenu items in the list display, the selected submenu item is indicated by highlighting. The user is able to change the selected submenu item by operating the up button BUP and the down button BDN of the remote controller 102. The user changes the selected submenu item as needed, then operates the right button BRT of the remote controller 102. By operating the right button BRT, the submenu corresponding to the selected submenu item is displayed.

Figure 4B:
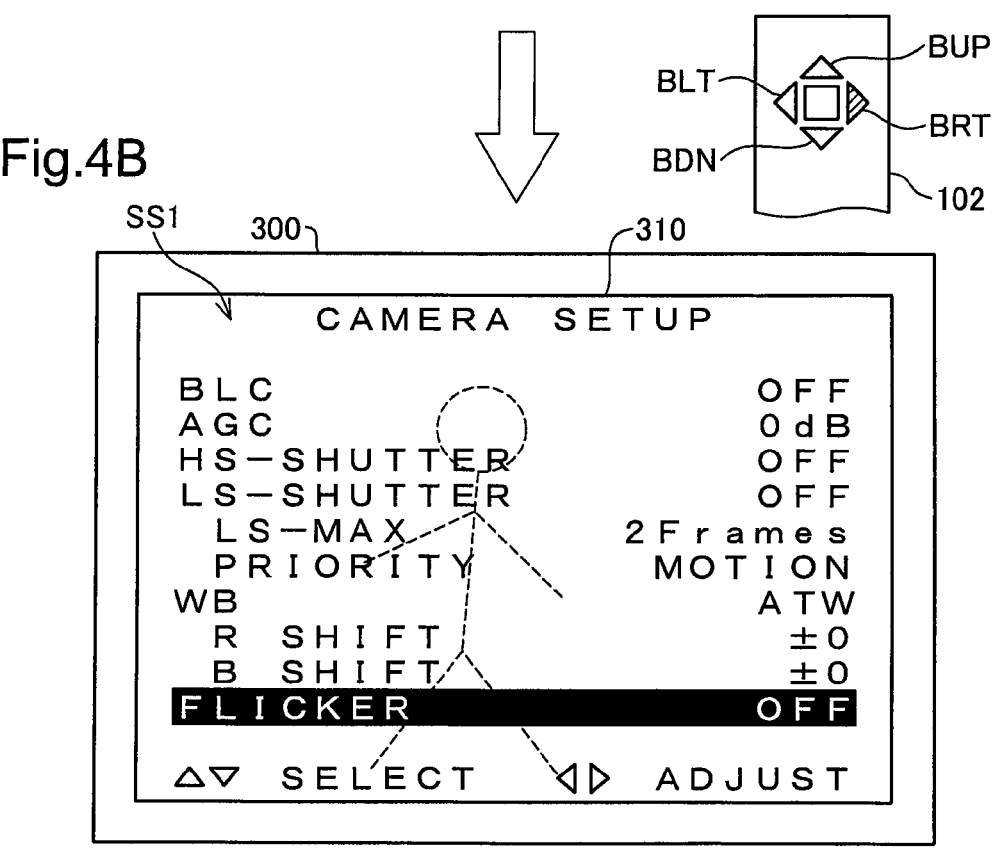

FIG. 4B shows a settings screen SS1 that is displayed in response to operation of the right button BRT (hatched area) of the remote controller 102 when the "CAMERA SETUP" submenu item is selected as shown in FIG. 4A. In the example of FIG. 4B, a submenu corresponding to the "CAMERA SETUP" submenu item is displayed as the settings screen SS1 superimposed on the video image shot by the video camera 100.

On the settings screen SS1 are displayed various setting items that specify fundamental behavior of the video camera 100, as well as their current setting values. When one setting item is selected from among these setting items, the selected setting item is indicated by highlighting. The selected setting item may change according to the user's operation of the up button BUP or the down button BDN of the remote controller 102. When the user operates the right button BRT or the left button BLT of the remote controller 102, the setting value of the selected setting item is modified. The modified setting is saved to the nonvolatile memory 252 of the camera operation setting unit 250 (FIG. 2).

Modification of setting values from the settings screen SS1 terminates through operation of the down button BDN of the remote controller 102 while the lowermost setting item (FLICKER) displayed in the settings screen SS1 is selected. Similarly, modification of setting values from the settings screen SS1 terminates through operation of the up button BUP of the remote controller 102 while the uppermost setting item (BLC) displayed in the settings screen SS1 is selected. When modification of setting values terminates, the settings screen SM showing the main menu is displayed again as shown in FIG. 4A.

In the example of FIG. 4B, the "FLICKER" setting item is selected from among the several setting items displayed on the settings screen SS1. Consequently, the "FLICKER" setting item and its current setting of "OFF" is highlighted. This setting of the "FLICKER" setting item represents the current operating mode (flicker reduction mode) of the flicker reduction unit 240 (FIG. 2). If the user operates the right button BRT and the left button BLT of the remote controller 102, the flicker reduction mode changes, and the setting of the "FLICKER" setting item also changes. An order of precedence is assigned to the flicker reduction modes, on the basis of the characteristics of the video signal VSG output from the video camera 100. In response to user's operation of the right button BRT of the remote controller 102, the flicker reduction mode sequentially changes from the mode of highest precedence order to the mode of next highest precedence order.

Where the flicker reduction mode is set to "OFF" as shown in FIG. 4B, the flicker reduction unit 240 (FIG. 2) controls the various parts of the video camera 100 (FIG. 2) under normal settings in which flicker reduction processing does not take place. Specifically, the flicker reduction unit 240 supplies to the imaging controller 210 an instruction for specifying a imaging frame rate of 60 FPS, an instruction for setting the electronic shutter to off, and an instruction for specifying a gain multiplier of 1. The flicker reduction unit 240 also sends an instruction for specifying an output frame rate of 60 FPS to the frame readout controller 220. The imaging controller 210 and the frame readout controller 220 respectively control the image sensor 110 and the frame rate converter 130 on the basis of the instructions supplied from the flicker reduction unit 240. Thus, each of the imaging frame rate and the output frame rate are set to 60 FPS, and the electronic shutter is set to the off state (i.e. the state in which the electronic shutter remains open).

FIGS. 5A through 5D are illustrations depicting shooting by the video camera 100 with the flicker reduction mode set to "OFF." In the example of FIGS. 5A through 5D, the monitoring system 10 shown in FIG. 1 is depicted as being used in a region where the commercial power frequency is 50 Hz. In the graphs of FIGS. 5A through 5D, the horizontal axis represents time. FIG. 5A shows the frame being shot by the video camera 100. FIG. 5D shows the state of the electronic shutter. FIGS. 5C and 5D show temporal variation of luminance of the fluorescent lamp 20.

Typically, the luminance of the fluorescent lamp 20 fluctuates either at a frequency equal to the commercial power frequency or at a frequency twice of the commercial power frequency. In the example of FIGS. 5A through 5D, since the commercial power frequency is 50 Hz, the luminance of the fluorescent lamp 20 fluctuates at 50 Hz as shown in FIG. 5C, or fluctuates at 100 Hz as shown in FIG. 5D. Thus, fluctuation in the lightness of a subject illuminated by the fluorescent lamp 20 contains 50 Hz and 100 Hz fluctuation components. Depending on various conditions such as the usage time of the fluorescent lamp 20, the shape of the fluorescent lamp 20, and location in the fluorescent lamp 20, fluctuation in luminance of the fluorescent lamp 20 varies between a frequency equal to the commercial power frequency and a frequency twice of the commercial power frequency. Accordingly, depending on the condition of the fluorescent lamp 20, in some instances the 50 Hz fluctuation component predominates in fluctuation in the lightness of the subject, while in other in instances the 100 Hz fluctuation component predominates.

Where the flicker reduction mode is "OFF," since as noted previously the imaging frame rate has been set to 60 FPS, the image sensor 110 generates each single frame of image data in a frame interval which is 1/60 second (s) in duration. Moreover, since the electronic shutter is OFF, each single frame of image data generated by the image sensor 110 is generated according to the amount of light incident on the image sensor 110 during the entire 1/60-second frame interval. Thus, if the luminance fluctuation period of the fluorescent lamp 20 does not match the frame interval as shown in FIGS. 5A through 5D, the integration value of luminance of the frame interval, i.e. the area of the portions indicated by hatching in the same direction in FIG. 5C or FIG. 5D, varies on a frame-by-frame basis. Consequently, the integration value of subject lightness varies on a frame-by-frame basis, and flicker appears on the video image shot by the video camera 100, i.e. brightness fluctuates on a frame-by-frame basis.

Figure 6A:
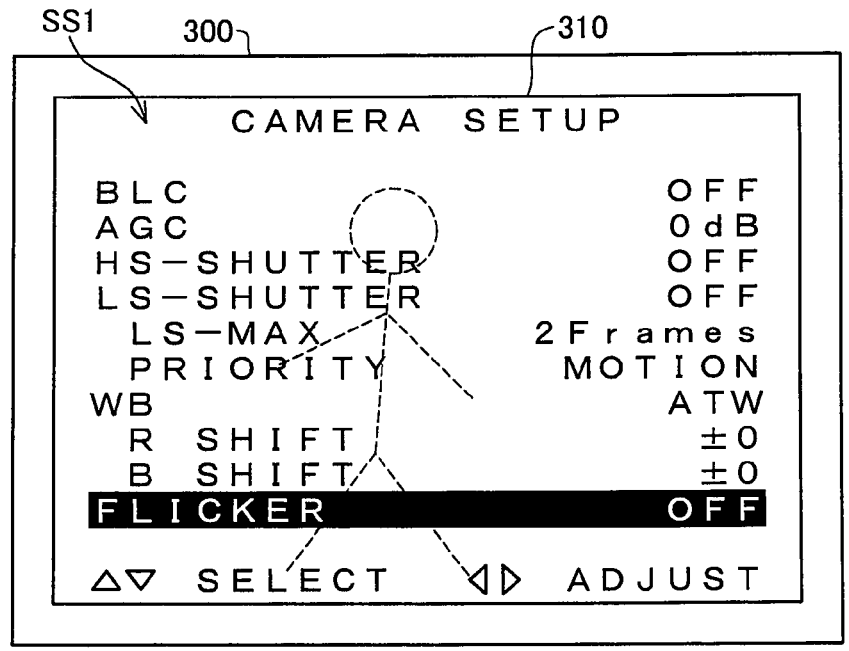
FIGS. 6A and 6B are illustrations depicting changing of the flicker reduction mode from "OFF" to "DECREASE"
Figure 6B:
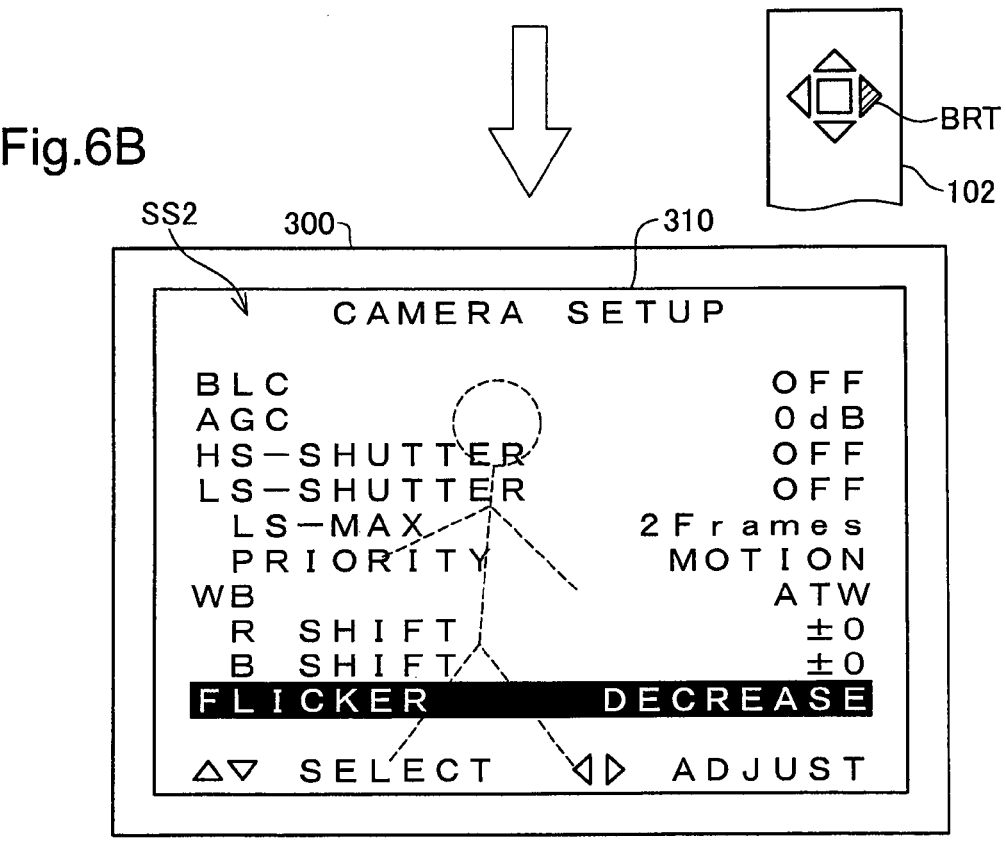

FIGS. 6A and 6B are illustrations depicting changing of the flicker reduction mode from "OFF" to "DECREASE." FIG. 6A is an illustration identical to FIG. 4B showing the settings screen SS1 with the flicker reduction mode set to "OFF." When the settings screen SS1 is displayed, the flicker reduction mode changes from "OFF" to "DECREASE" in response to the user's operation of the right button BRT (hatched portion) of the remote controller 102, and as shown in FIG. 6B, a settings screen SS2 in which the setting value display of the "FLICKER" setting item changes to "DECREASE" is displayed.

Where the flicker reduction mode is set to "DECREASE" as shown in FIG. 6B, the flicker reduction unit 240 (FIG. 2) controls the various parts of the video camera 100 (FIG. 2) in such a way as to reduce flicker. Specifically, the flicker reduction unit 240 supply to the imaging controller 210 an instruction to set a imaging frame rate to 60 FPS, an instruction specifying shutter speed of 1/100 second for the electronic shutter, and an instruction specifying a gain multiplier of approximately 1.6 (1/0.6). The flicker reduction unit 240 also sends an instruction specifying an output frame rate of 60 FPS to the frame readout controller 220. The imaging controller 210 and the frame readout controller 220 respectively control the image sensor 110 and the frame rate converter 130 on the basis of the instructions supplied from the flicker reduction unit 240. Thus, each of the imaging frame rate and the output frame rate is set to 60 FPS, and the shutter speed of the electronic shutter is set to 1/100 second, (i.e. a state in which the electronic shutter opens for 1/100 second during each single frame interval).

FIGS. 7A through 7D are illustrations depicting shooting by the video camera 100 with the flicker reduction mode set to "DECREASE." In the example of FIGS. 7A through 7D, as in FIGS. 5A through 5D, the monitoring system 10 (FIG. 1) is depicted as being used in a region where the commercial power frequency is 50 Hz. In the graphs of FIGS. 7A through 7D, the horizontal axis represents time. FIG. 7A shows the frame being shot by the video camera 100. FIG. 7B shows the open/close state of the electronic shutter. FIGS. 7C and 7D show temporal variations in luminance of the fluorescent lamp 20.

As noted, where the flicker reduction mode is set to "DECREASE," the imaging frame rate is set to 60 FPS, and the shutter speed is set to 1/100 second. Thus, a single frame of image data is generated according to the amount of light incident on the image sensor 110 during an interval of 1/100 second.

Where the luminance of the fluorescent lamp 20 fluctuates at 50 Hz as shown in FIG. 7C, the integration value of luminance of the interval during which the electronic shutter is open (the area of the hatched portions) varies on a frame-by-frame basis. Consequently, where the predominant component of fluctuation in lightness of the subject is 50 Hz, there is no appreciable reduction in flicker of video shot by the video camera 100.

On the other hand, where the luminance of the fluorescent lamp 20 fluctuates at 100 Hz as shown in FIG. 7D, the integration value of luminance during which the electronic shutter is open does not change. Consequently, where the predominant component of fluctuation in lightness of the subject is 100 Hz, fluctuation in brightness on a frame-by-frame basis of video shot by the video camera 100 is suppressed, and flicker is reduced.

In the above manner, with the flicker reduction mode at "DECREASE" the imaging frame rate of the video camera 100 is set to 60 FPS and the shutter speed is set to 1/100 second. Therefore, flicker is reduced in instances where the predominant component of fluctuation in lightness of the subject is 100 Hz. Typically, in a subject illuminated by the fluorescent lamp 20, most of the light comes from the center part of the fluorescent lamp 20, with little light coming from the ends of the fluorescent lamp 20. In general, at the ends of the fluorescent lamp 20 luminance fluctuation is equal to the commercial power frequency as shown in FIG. 7C, while in the center part of the fluorescent lamp 20 luminance fluctuation tends to be a twice of the commercial power frequency as shown in FIG. 7D. Thus, since the predominant component of fluctuation in lightness of the subject is typically 100 Hz, sufficient reduction in flicker is achieved even with the flicker reduction mode at "DECREASE." However, depending on various parameters such as the illumination method or usage time of the fluorescent lamp, where predominant component of fluctuation in lightness is 50 Hz there may be no appreciable reduction of flicker.

Moreover, as noted previously, where the flicker reduction mode is "DECREASE," gain of the image signal is set to higher level than normal gain, and thus the S/N ratio of the image data drops. Meanwhile, the imaging frame rate is set to the standard frame rate (60 FPS). For this reason, decline in dynamic resolution of video image shot by the video camera 100 may be avoided.

Figure 8A:
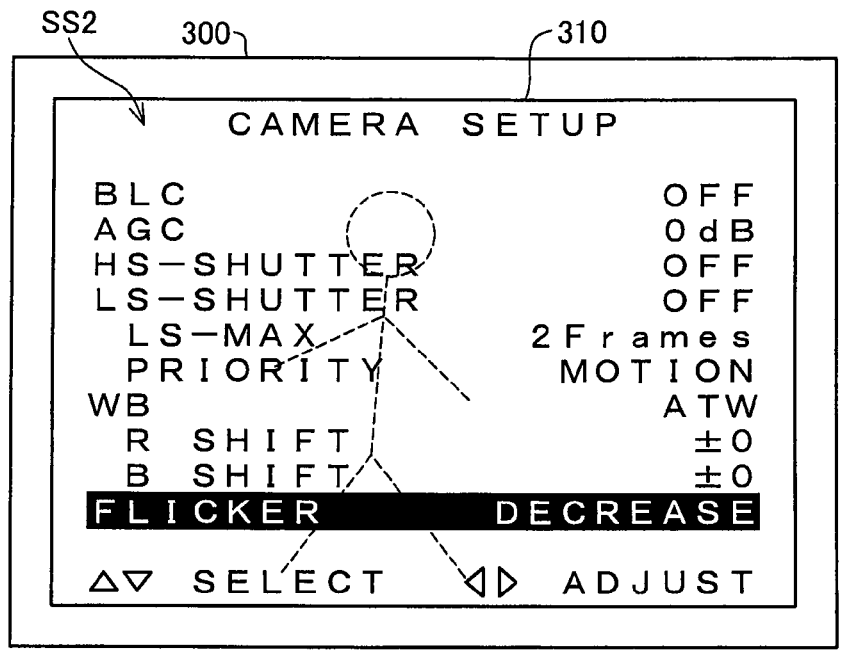
FIGS. 8A and 8B are illustrations depicting changing of the flicker reduction mode from "DECREASE" to "LESS1"
Figure 8B:
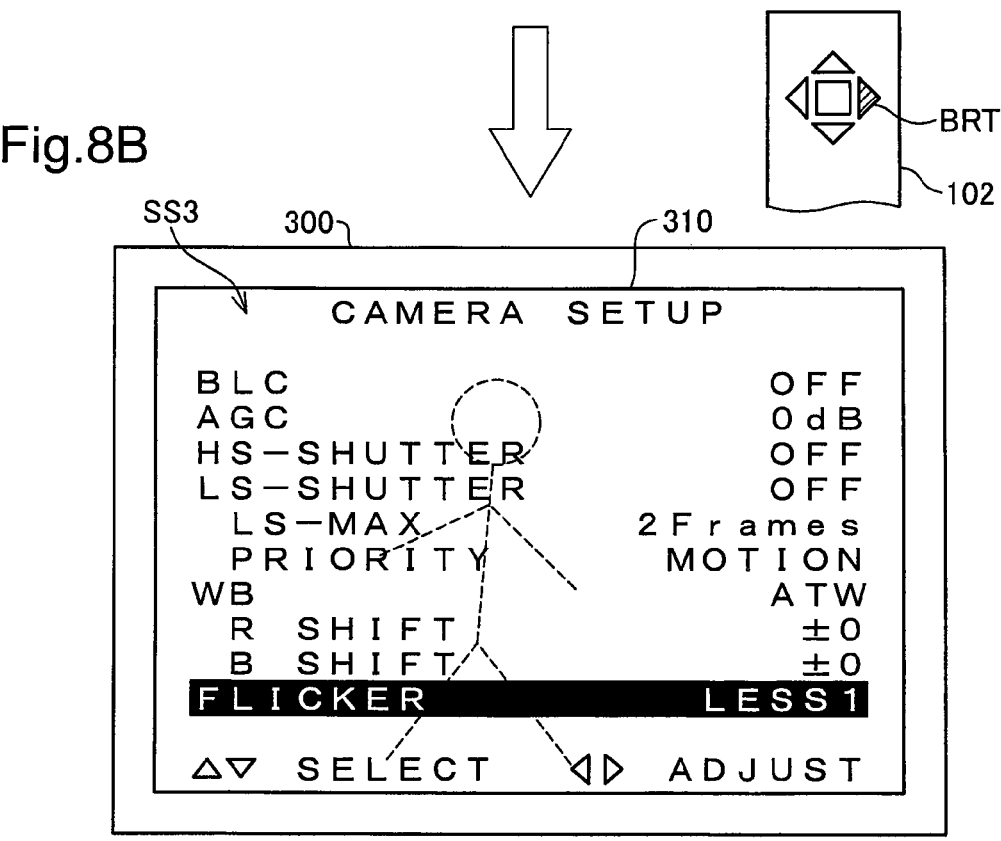

FIGS. 8A and 8B are illustrations depicting changing of the flicker reduction mode from "DECREASE" to "LESS1." FIG. 8A is an illustration identical to FIG. 6B showing the settings screen SS2 with the flicker reduction mode set to "DECREASE." When the settings screen SS2 is displayed, the flicker reduction mode changes from "DECREASE" to "LESS1" in response to the user's operation of the right button BRT (hatched portion) of the remote controller 102, and as shown in FIG. 8B a settings screen SS3 in which the setting value display of the "FLICKER" setting item changes to "LESS1" is displayed.

Where the flicker reduction mode is set to "LESS1" as shown in FIG. 8B, the flicker reduction unit 240 (FIG. 2) controls the various parts of the video camera 100 (FIG. 2) in such a way as to reduce flicker to a greater extent than where the flicker reduction mode has been set to "DECREASE." Specifically, the flicker reduction unit 240 supplies to the imaging controller 210 an instruction specifying a imaging frame rate of 30 FPS, an instruction specifying shutter speed of 1/50 second for the electronic shutter, and an instruction specifying a gain multiplier of approximately 0.8 (1/1.2). The flicker reduction unit 240 also sends an instruction specifying an output frame rate of 60 FPS to the frame readout controller 220. The imaging controller 210 and the frame readout controller 220 respectively control the image sensor 110 and the frame rate converter 130 on the basis of the instructions supplied from the flicker reduction unit 240. Thus the imaging frame rate is set to 30 FPS, and the shutter speed of the electronic shutter is set to 1/50 second, (i.e. a state in which the electronic shutter opens for 1/50 second during each single frame interval). The output frame rate is set to 60 FPS.

FIGS. 9A through 9D are illustrations depicting shooting by the video camera 100 with the flicker reduction mode set to "LESS1." In the example of FIGS. 9A through 9D, as in FIGS. 5A through 5D, the monitoring system 10 (FIG. 1) is depicted as being used in a region where the commercial power frequency is 50 Hz. In the graphs of FIGS. 9A through 9D, the horizontal axis represents time. FIG. 9A shows the frame being shot by the video camera 100. FIG. 9B shows the open/close state of the electronic shutter. FIGS. 9C and 9D show temporal variations in luminance of the fluorescent lamp 20.

As shown in FIG. 9C, by setting the shutter speed to 1/50 second, the integration value of luminance of the interval during which the electronic shutter is open (the area of the hatched portions) no longer varies, even where the luminance of the fluorescent lamp 20 fluctuates at 50 Hz. Moreover, as shown in FIG. 9D, the integration value of luminance of the interval during which the electronic shutter is open (the area of the hatched portions) does not vary even where the luminance of the fluorescent lamp 20 fluctuates at 100 Hz. Consequently, irrespective of whether the predominant component of fluctuation in lightness of the subject is 50 Hz or 100 Hz, fluctuation in brightness on a frame-by-frame basis of video image shot by the video camera 100 is suppressed, and flicker is reduced.

By setting the imaging frame rate of the video camera 100 to 30 FPS and setting the shutter speed to 1/50 second in this way, flicker caused by fluctuation in lightness of the subject is reduced irrespective of the condition of the fluorescent lamp 20. The video image shot at an imaging frame rate of 30 FPS is converted to 60 FPS video in the frame rate converter, and 60 FPS video image output from the video camera 100.

Moreover, as noted previously, where the flicker reduction mode is "LESS1," gain of the image signal is set to lower level than normal gain, and thus the S/N ratio of the image data improves. Meanwhile, the imaging frame rate is set to 30 FPS, which represents half of the standard frame rate (60 FPS). For this reason, dynamic resolution of video image shot by the video camera 100 declines.

Figure 10A:
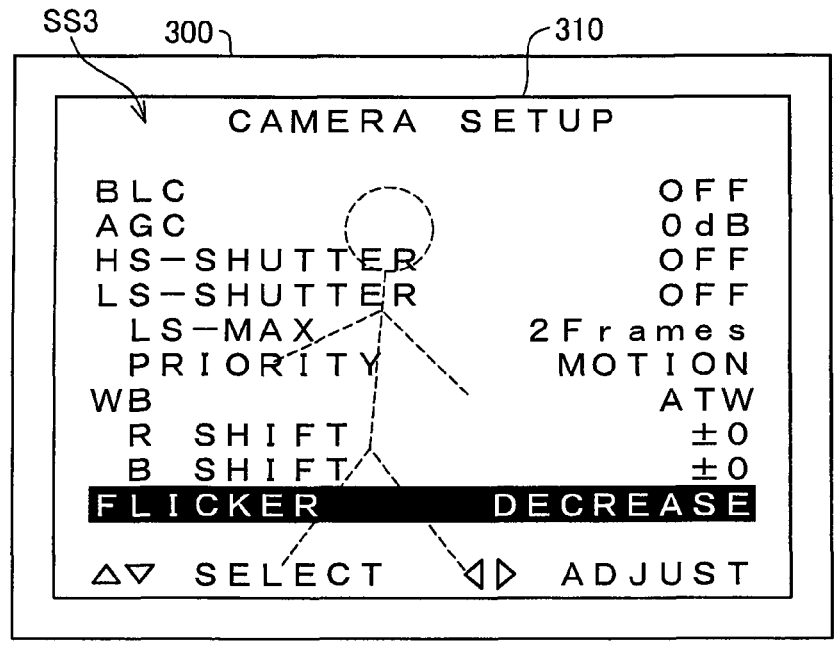
FIGS. 10A and 10B are illustrations depicting changing of the flicker reduction mode from "LESS1" to "LESS2"
Figure 10B:
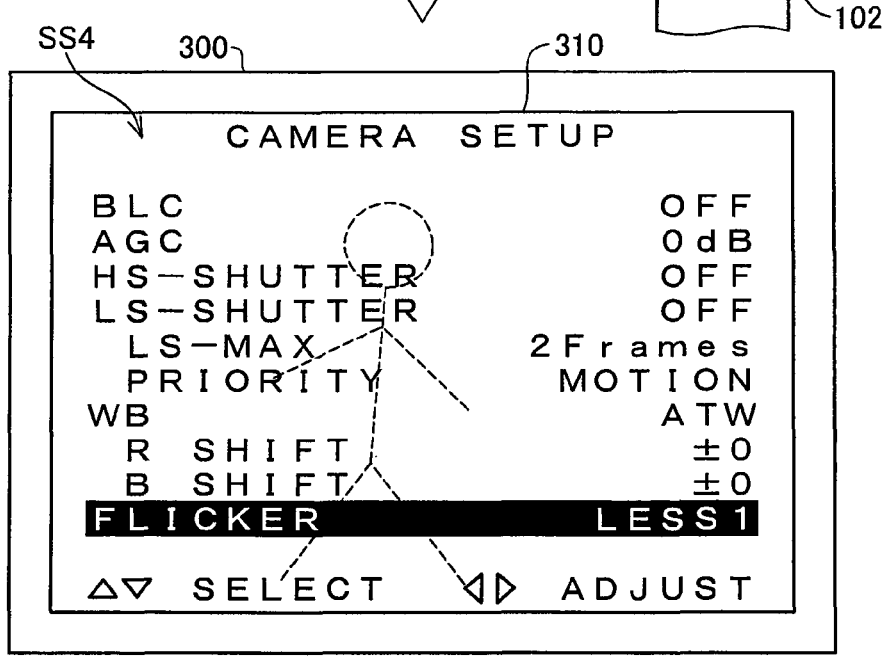

FIGS. 10A and 10B are illustrations depicting changing of the flicker reduction mode from "LESS1" to "LESS2." FIG. 10A is an illustration identical to FIG. 8B showing the settings screen SS3 with the flicker reduction mode set to "LESS1." When the settings screen SS3 is displayed, the flicker reduction mode changes from "LESS1" to "LESS2" in response to the user's operation of the right button BRT (hatched portion) of the remote controller 102. A settings screen SS4 in which the setting value display of the "FLICKER" setting item changes to "LESS2" is displayed on the display screen 310 of the video monitor 300.

Where the flicker reduction mode is set to "LESS2" as shown in FIG. 10B, the flicker reduction unit 240 (FIG. 2) control the various parts of the video camera 100 (FIG. 2) in such a way as to reduce flicker to a greater extent than where the flicker reduction mode has been set to "DECREASE." Specifically, the flicker reduction unit 240 supplies to the imaging controller 210 an instruction specifying a imaging frame rate of 50 FPS, an instruction specifying that the electronic shutter go to OFF, and an instruction specifying a gain multiplier of approximately 0.8 (1/1.2). The flicker reduction unit 240 also send an instruction specifying an output frame rate of 50 FPS to the frame readout controller 220. The imaging controller 210 and the frame readout controller 220 respectively control the image sensor 110 and the frame rate converter 130 on the basis of the instructions provided from the flicker reduction unit 240. Thus, both of the imaging frame rate and the output frame rate are set to 50 FPS, and the electronic shutter is set to the OFF state.

FIGS. 11A through 11D are illustrations depicting shooting by the video camera 100 with the flicker reduction mode set to "LESS2." In the example of FIGS. 11A through 11D, as in FIGS. 5A through 5D, the monitoring system 10 (FIG. 1) is depicted as being used in a region where the commercial power frequency is 50 Hz. In the graphs of FIG. 11A through 11D, the horizontal axis represents time. FIG. 11A shows the frame being shot by the video camera 100. FIG. 11B shows the open/close state of the electronic shutter. FIGS. 11C and 11D show temporal variations in luminance of the fluorescent lamp 20.

As shown in FIGS. 11A through 11D, where the imaging frame rate is set to 50 FPS and the electronic shutter is set to the OFF state, each single frame of image data, which is corresponding to the amount of light incident on the image sensor 110 during the entire 1/50-second frame interval, is generated. In this case, the integration value of luminance of the fluorescent lamp 20 of the frame interval (the area of the hatched portions) does not change regardless of the luminance of the fluorescent lamp 20 fluctuating at 50 Hz or fluctuating at 100 Hz. Consequently, irrespective of whether the predominant component of fluctuation in lightness of the subject is 50 Hz or 100 Hz, fluctuation in brightness on a frame-by-frame basis of video image shot by the video camera 100 is suppressed, and flicker is reduced.

In the first embodiment, with the flicker reduction mode set to "LESS2" the electronic shutter is set to the OFF state. It is also possible to instead set the electronic shutter to any state besides the OFF state. Even if the electronic shutter is set other than OFF state, the frame start timing synchronizes with luminance fluctuation at both 50 Hz and 100 Hz. Thus, fluctuation in brightness on a frame-by-frame basis is suppressed irrespective to the shutter speed setting.

By setting the imaging frame rate of the video camera 100 to 50 FPS in this way, flicker caused by fluctuation in lightness of the subject is reduced irrespective of the condition of the fluorescent lamp 20. Moreover, since gain of the image signal is set to lower level than normal gain, the S/N ratio of the image data improves, and since the imaging frame rate (50 FPS) is sufficiently high, decreases of dynamic resolution may not cause problem substantially. However, the video monitor 300 (FIG. 1) is designed generally to receive a 60 FPS video signal compliant with the NTSC system. For this reason, depending on the video monitor 300, it may not be possible to display a video signal with frame rate equal to the 50 FPS imaging frame rate.

Figure 12A:
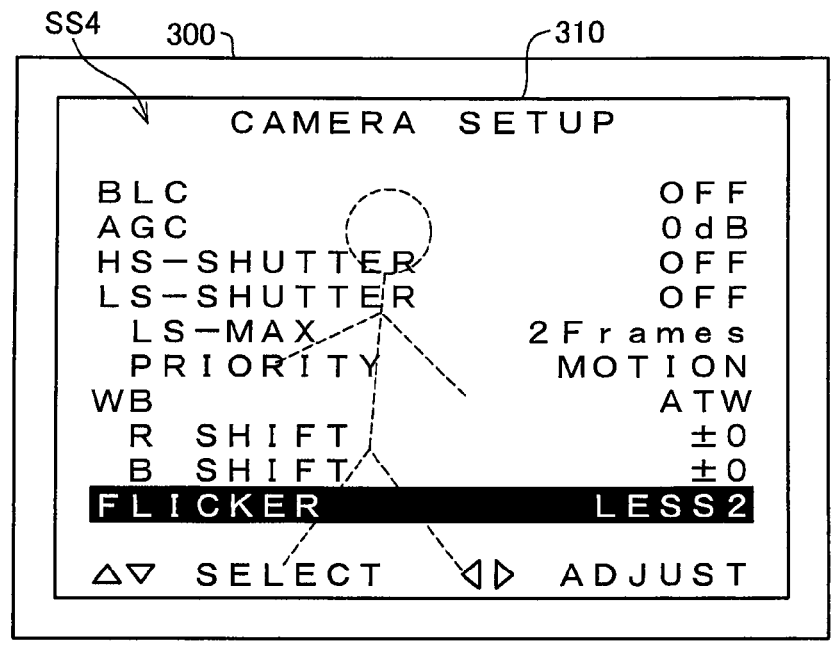
FIGS. 12A and 12B are illustrations depicting changing of the flicker reduction mode from "LESS2" to "LESS3"
Figure 12B:
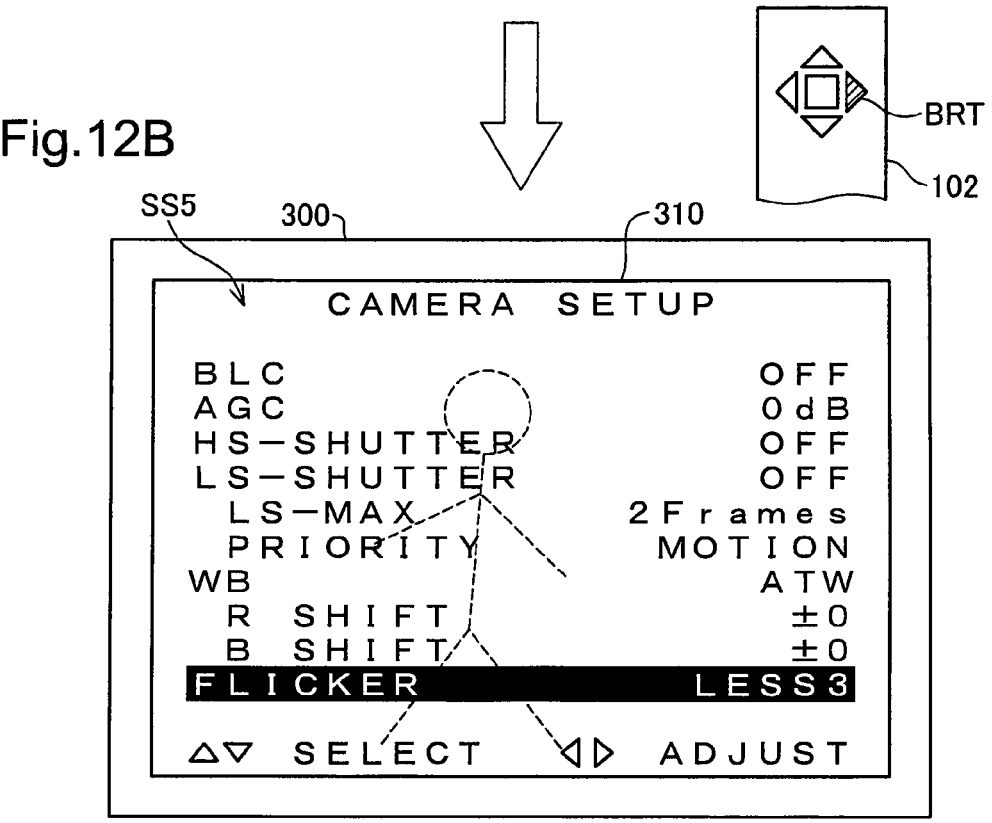

FIGS. 12A and 12B are illustrations depicting changing of the flicker reduction mode from "LESS2" to "LESS3." FIG. 12A is an illustration identical to FIG. 10B showing the settings screen SS4 with the flicker reduction mode set to "LESS2." When the settings screen SS4 is displayed, the flicker reduction mode changes from "LESS2" to "LESS3" in response to the user's operation of the right button BRT of the remote controller 102. A settings screen SS5 in which the setting of the "FLICKER" setting item is changed to "LESS3" is displayed on the display screen 310 of the video monitor 300.

Where the flicker reduction mode is set to "LESS3" as shown in FIG. 12B, in the same manner as where the flicker reduction mode has been set to "LESS2," the flicker reduction unit 240 (FIG. 2) control the various parts of the video camera 100 (FIG. 2) in such a way as to reduce flicker to a greater extent than where the flicker reduction mode has been set to "DECREASE." Specifically, the flicker reduction unit 240 supplies to the imaging controller 210 an instruction specifying a imaging frame rate of 50 FPS, an instruction specifying that the electronic shutter go to OFF, and an instruction specifying a gain multiplier of approximately 0.8 (1/1.2). The flicker reduction unit 240 also sends an instruction specifying an output frame rate of 60 FPS to the frame readout controller 220. The imaging controller 210 and the frame readout controller 220 respectively control the image sensor 110 and the frame rate converter 130 on the basis of the instructions supplied from the flicker reduction unit 240. Thus, the imaging frame rate is set to 50 FPS, and the electronic shutter is set to the OFF state. The output frame rate is set to 60 FPS.

By setting the imaging frame rate to 50 FPS as described above it is possible to reduce flicker occurring in regions of 50 Hz commercial power frequency. Additionally, by setting the output frame rate to 60 FPS it is possible for a 60 FPS video signal VSG to be generated by the output signal generator 160 and output by the video camera 100. Converting the frame rate of the video signal VSG to 60 FPS in this way reduces the risk that the video cannot be displayed on the video monitor 300. However, performing frame rate conversion poses a risk that the video image has an unnatural appearance subsequent to frame rate conversion.

The flicker reduction unit 240 of the video camera 100 of the first embodiment is furnished with the four different flicker reduction modes ("DECREASE," "LESS1,"

"LESS2," "LESS3") above. The flicker reduction modes may be set through operations on the on-screen display which is displayed superimposed on the video shot by the video camera 100. As a result, the user is able to set the flicker reduction method while viewing video displayed on the video monitor 300, making it easy to set the flicker reduction method.

Moreover, in the first embodiment, for each of the plurality of flicker reduction modes an order of precedence based on characteristics of the video signal VSG is assigned. In accordance with this order of precedence the flicker reduction modes cycles sequentially in the order "DECREASE," "LESS1," "LESS2," and "LESS3." This makes it easier to set a more appropriate flicker reduction mode. Note that, the flicker reduction mode cycle order is not limited to the order given above.

B. Second Embodiment

Figure 13:
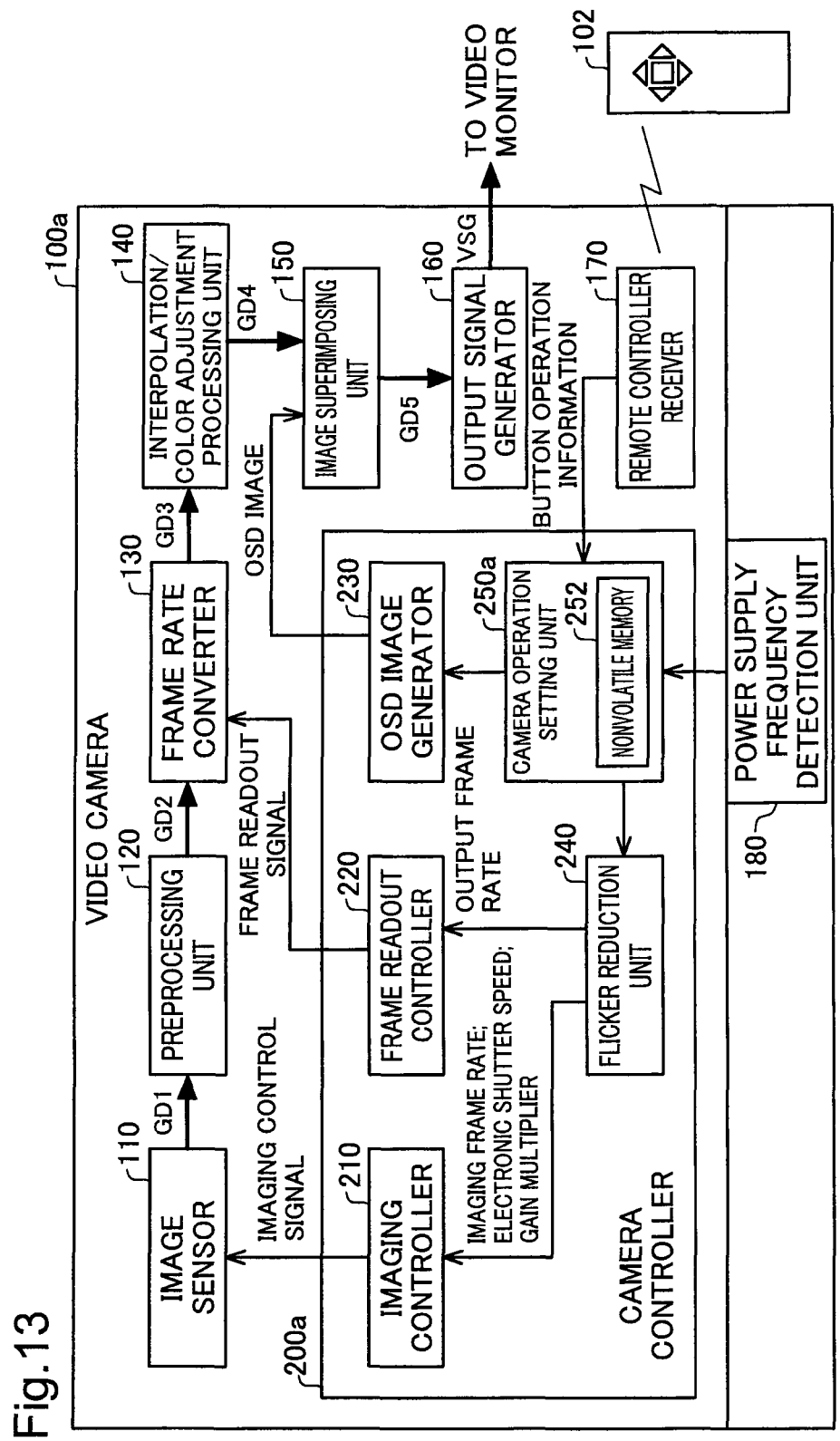
FIG. 13 is a block diagram showing the functional configuration of a video camera 100a in a second embodiment.

FIG. 13 is a block diagram showing the functional configuration of a video camera 100a in a second embodiment. The video camera 100a of the second embodiment differs from the video camera 100 of the first embodiment in that the former is equipped with a commercial power frequency detection unit 180, and a camera operation setting unit 250a is connected to this commercial power frequency detection unit 180. In other aspects it is similar to the video camera 100 of the first embodiment.

The commercial power frequency detection unit 180 detects the commercial power frequency of the region in which the video camera 100a is situated. Specifically, it detects whether the frequency of the power supplied to the video camera 100a is 50 Hz or 60 Hz. Detection of commercial power frequency can be accomplished through the use of a frequency counter, a detector employing a band pass filter, or similar device. The detection result of commercial power frequency with the commercial power frequency detection unit 180 is supplied to the camera operation setting unit 250a.

Figure 14:
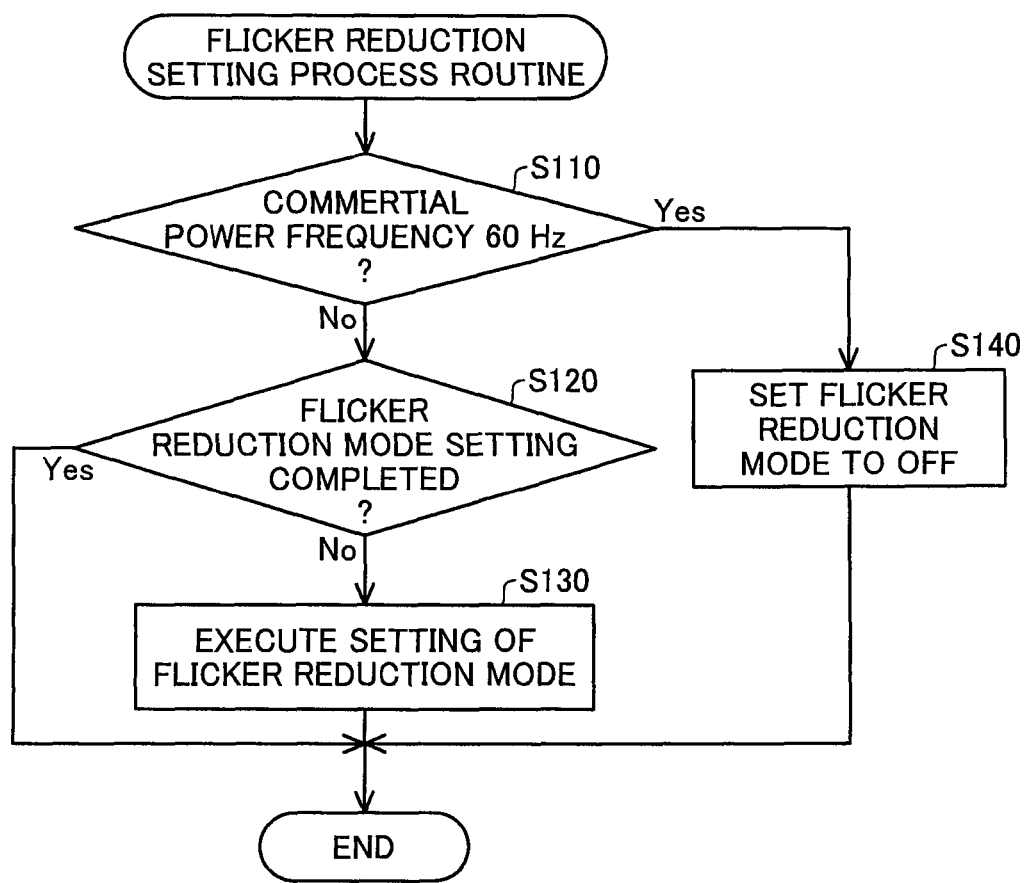
FIG. 14 is a flowchart depicting a flicker reduction setting process routine executed by the camera operation setting unit 250a of the second embodiment.

FIG. 14 is a flowchart depicting a flicker reduction setting process routine executed by the camera operation setting unit 250a of the second embodiment. This flicker reduction setting process routine is executed when the video camera 100a is powered on.

In Step S110, the camera operation setting unit 250a determines whether the commercial power frequency is 60 Hz. If the commercial power frequency is 60 Hz, control passes to Step S160. If on the other hand the commercial power frequency is not 60 Hz, i.e. if the commercial power frequency is 50 Hz, control passes to Step S120.

In Step S120, the camera operation setting unit 250a determines whether the flicker reduction mode has been set. Specifically, the camera operation setting unit 250a refers the nonvolatile memory 252 provided to the camera operation setting unit 250a. Then, the camera operation setting unit 250a determines whether setting of the flicker reduction mode is done based on the set/reset status of a setting-completion flag which is set when the flicker reduction mode has been set. If the setting-completion flag is set, it is determined that setting of the flicker reduction mode is done and the flicker reduction setting process routine terminates. If on the other hand the setting-completion flag is reset, it is determined that setting of the flicker reduction mode is not yet done and control passes to Step S130.

In Step S130, the camera operation setting unit 250a carries out setting of the flicker reduction mode. Specifically, the camera operation setting unit 205a displays the settings screen SS1 shown in FIG. 4B and prompts the user to set the flicker reduction mode. Then, the camera operation setting unit 250a sets the flicker reduction mode based on the user's instruction. After setting of the flicker reduction mode, the flicker reduction setting process routine of FIG. 14 terminates.

In Step S160, the camera operation setting unit 250a sets the flicker reduction mode to "OFF." After setting of the flicker reduction mode to "OFF", the flicker reduction setting process routine of FIG. 14 terminates.

In this way, according to the second embodiment, the commercial power frequency is detected. In the event that the commercial power frequency is 50 Hz, meaning that there is a possibility that flicker reduction is necessary, and the flicker reduction mode has not yet been set, the user is prompted to set the flicker reduction mode. If on the other hand the commercial power frequency is 60 Hz, meaning that flicker reduction is not necessary, the flicker reduction mode is set to "OFF." Thus, in instances where it is desirable to set the flicker reduction mode, the user is prompted to set the flicker reduction mode, making it easier to set a more appropriate flicker reduction mode.

In the second embodiment, the flicker reduction mode is set to "OFF" in the event that the commercial power frequency is 60 Hz. It is also acceptable to reset the setting-completion flag in the event that the commercial power frequency is 60 Hz. This arrangement will make it easier to set the flicker reduction mode even if the camera transported between regions of different commercial power frequency.

C. Modifications

The invention is not limited to the embodiment discussed above, and may be reduced to practice in various other forms without departing from the spirit thereof, such as the following modifications, for example.

C1. Modification 1:

In the preceding embodiments, flicker reduction is carried out through control of opening and closing of the electronic shutter provided to the image sensor 110 (FIG. 2). It is also possible to reduce flicker through control of opening and closing of an optical shutter in place of the electronic shutter. As the optical shutter it is possible to use any of various kinds of shutters capable of controlling the time for which light entering to the image sensor 110, such as a mechanical shutter, or a liquid crystal shutter which utilizes changes in transmittance of liquid crystals.

C2. Modification 2:

In the preceding embodiments the flicker reduction unit 240 (FIG. 2) is provided with four different flicker reduction modes ("DECREASE," "LESS1," "LESS2," and "LESS3"), but the flicker reduction modes provided to the flicker reduction unit 240 are not necessarily limited to these four flicker reduction modes. In general, it is acceptable for the flicker reduction unit 240 to be provided with any two or more flicker reduction modes from among these four flicker reduction modes. Also, the flicker reduction unit 240 may be furnished with flicker reduction modes different from these four flicker reduction modes.

C3. Modification 3:

In the preceding embodiments, the standard frame rate of the video signal is 60 FPS so as to be compliant with the NTSC system. The present invention could also be implemented in cases where the standard frame rate differs from 60 FPS. For example, the present invention is applicable to a 50 FPS standard frame rate for a video signal compliant with the PAL standard. In this case, the flicker reduction modes, and the control modalities of the imaging controller 210 and the frame readout controller 220 in each individual mode, may be modified appropriately for the standard frame rate.

C4. Modification 4:

In the preceding embodiments, settings of the video camera 100 (FIG. 1) are made thorough user operation of the remote controller 102. The settings of the video camera 100 may be made without the use of the remote controller 102. For example, the video camera 100 may be provided with buttons for operation by the user, with settings of the video camera 100 being made by acquiring a pattern of button operation by the user.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera comprising:
an imaging unit configured to perform imaging of a subject and to generate a subject image;
a superimposing image generator configured to generate a superimposing image to be superimposed on the subject image;
an image synthesizer configured to synthesize the subject image and the superimposing image to generate a synthesized image;
a video signal generator configured to generate a video signal from the synthesized image, the video signal being output from the video camera so as to display the synthesized image on a display;
a flicker reduction unit having a plurality of flicker reduction modes to reduce flicker caused by luminance fluctuation of a light source, each of the flicker reduction modes being configured to reduce flicker in different manner; and
a mode setting unit configured to cause the superimposing image generator to generate a settings screen as the superimposing image for assisting selection of one of the flicker reduction modes.

2. The video camera in accordance with claim 1 wherein the mode setting unit sequentially cycles through the flicker reduction modes in an order of precedence in response to instructions from a user, the order of precedence being established for the respective flicker reduction modes based on characteristics of the video signal during execution of the individual flicker.

3. A video camera comprising:
an imaging unit configured to perform imaging of a subject and to generate a subject image;
a superimposing image generator configured to generate a superimposing image to be superimposed on the subject image;
an image synthesizer configured to synthesize the subject image and the superimposing image to generate a synthesized image;
a video signal generator configured to generate a video signal from the synthesized image, the video signal being output from the video camera so as to display the synthesized image on a display;
a flicker reduction unit having a plurality of flicker reduction modes to reduce flicker caused by luminance fluctuation of a light source, each of the flicker reduction modes being configured to reduce flicker in different manner; and
a mode setting unit configured to cause the superimposing image generator to generate a settings screen as the superimposing image for assisting selection of one of the flicker reduction modes;
further comprising:
a commercial power frequency detector configured to detect the frequency of power supplied to the video camera,
wherein the mode setting unit causes the superimposing image generator to generate the settings screen in the event of a possibility that the commercial power frequency detected by the commercial power frequency detector causes flicker.

4. The video camera in accordance with claim 3 wherein the mode setting unit sequentially cycles through the flicker reduction modes in an order of precedence in response to instructions from a user, the order of precedence being established for the respective flicker reduction modes based on characteristics of the video signal during execution of the individual flicker.

5. A flicker reduction method for reducing flicker caused by luminance fluctuation of light source which illuminates a subject being imaged by a video camera, comprising the steps of:
imaging the subject and generating a subject image;
reducing flicker by executing a flicker reduction mode selected from a plurality of flicker reduction modes, each of the flicker reduction modes being configured to reduce flicker in different manner;
generating a settings screen for the purpose of assisting selection of one of the flicker reduction modes;
generating a synthesized image in which the settings screen is superimposed on the subject image; and
generating a video signal from the synthesized image, the video signal being output from the video camera so as to display the synthesized image on a display.

6. A flicker reduction method for reducing flicker caused by luminance fluctuation of light source which illuminates a subject being imaged by a video camera, comprising the steps of:
imaging the subject and generating a subject image;
reducing flicker by executing a flicker reduction mode selected from a plurality of flicker reduction modes, each of the flicker reduction modes being configured to reduce flicker in different manner;
generating a settings screen for the purpose of assisting selection of one of the flicker reduction modes;
generating a synthesized image in which the settings screen is superimposed on the subject image;
generating a video signal from the synthesized image, the video signal being output from the video camera so as to display the synthesized image on a display; and
detecting the frequency of commercial power supplied to the video camera with a commercial power frequency detector;
in the step of generating the settings screen, generating the settings screen in the event of a possibility that the commercial power frequency detected by the commercial power frequency detector causes flicker.

7. The method in accordance with claim 6, further comprising
sequentially cycling through the flicker reduction modes in an order of precedence in response to instructions from a user, the order of precedence being established for the respective flicker reduction modes based on characteristics of the video signal during execution of the individual flicker.

* * * * *